United States Patent [19]
Nilsson

[11] 3,716,731
[45] Feb. 13, 1973

[54] ARRANGEMENT FOR RECTILINEAR GUIDING OF A MACHINE MEMBER ALONG A BEAM

[75] Inventor: Sven Walter Nilsson, Partille, Sweden

[73] Assignee: SKF Industrial Trading and Development Co., N.V. Overtoom, the Netherlands

[22] Filed: July 19, 1971

[21] Appl. No.: 163,587

[52] U.S. Cl. ................................................310/13
[51] Int. Cl. ...........................................H02k 41/02
[58] Field of Search...............................310/12–14; 318/121, 135

[56] References Cited
UNITED STATES PATENTS 3,531,666  9/1970  Ford.......................................310/13
3,575,650  4/1971  Fengler................................318/135

Primary Examiner—D. F. Duggan
Attorney—Dexter N. Shaw et al.

[57] ABSTRACT

In a rectilinear guiding, a machine member being moveably supported on recirculating balls along a straight guide, said guide being designed as a beam, the cross sectional structure of which giving a high resistance to bending in all directions. Angular contact ball tracks being formed in machine member and beam, which latter is designed with ramps forming tangents to said tracks and smoothly sloping away therefrom in order to give the balls a smooth operation at the entry to and the egress from the loaded zone. The beam may preferably be composed by a compound material and serve as an active part of an electric linear motor being attached to the machine member.

6 Claims, 9 Drawing Figures

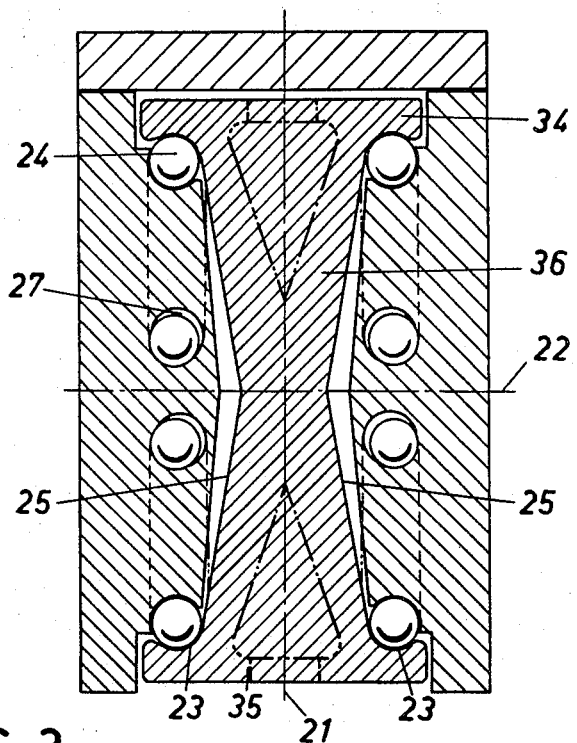
FIG. 4
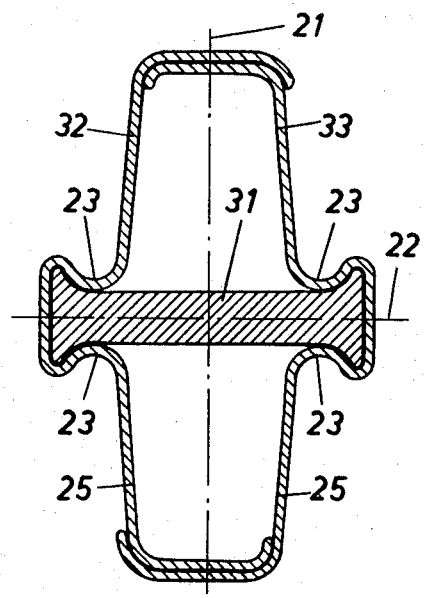
FIG. 3
FIG. 5

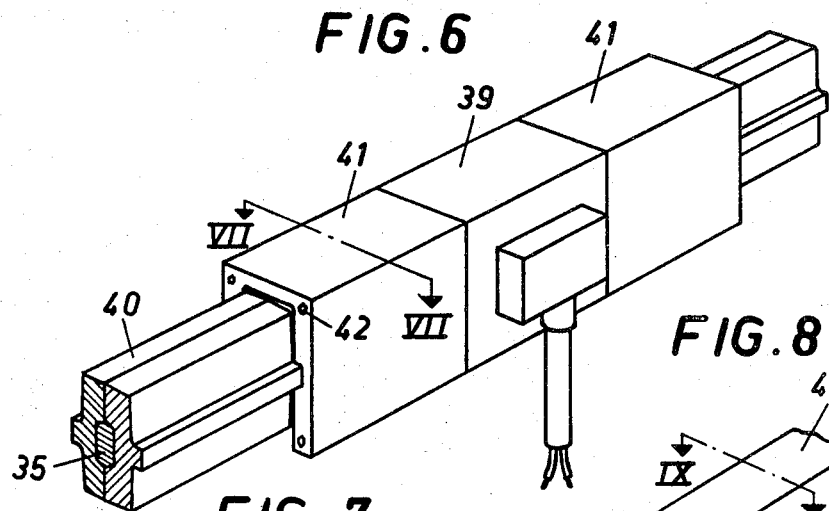
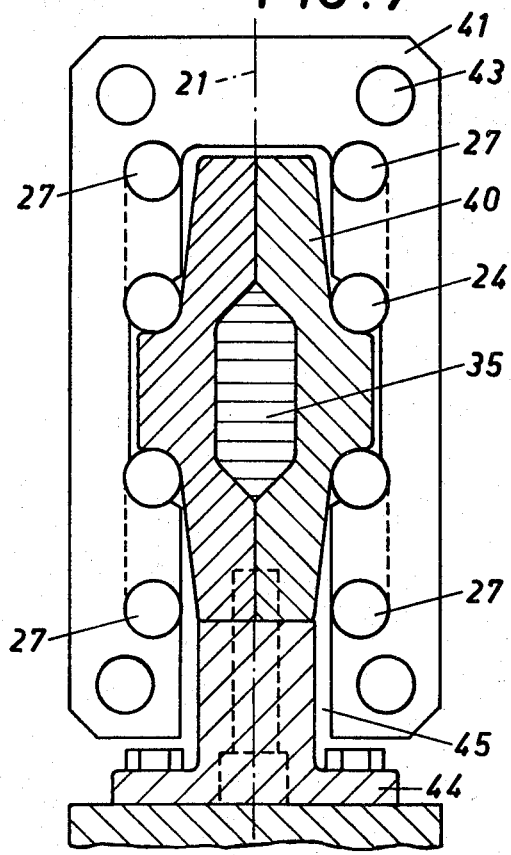
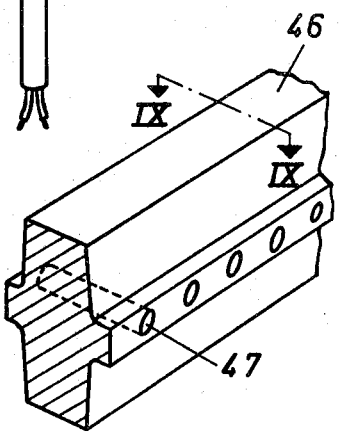
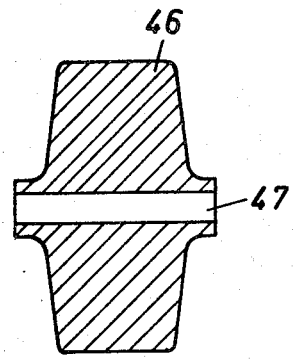
FIG. 6
FIG. 7
FIG. 8
FIG. 9

ARRANGEMENT FOR RECTILINEAR GUIDING OF A MACHINE MEMBER ALONG A BEAM

BACKGROUND OF THE INVENTION

With many types of machines it is desirable to be able to move a machine member linearly along a beam and in order to reduce the friction, rolling bearings of different types are often used. The present invention refers to an arrangement in which the beam has at least two parallel ball tracks arranged preferably on each side of the longitudinal central plane of the beam and which ball tracks are designed to give angular contact with the balls, whereby the machine member is provided with deflection and recirculation tracks for the balls. This arrangement will provide a smooth carrying of the load at the same time as the angular contact between two parallel rows of balls gives a very good guiding with respect to the beam. The beam will be designed in such a manner that a high resistance against bending in the vertical as well as the horizontal direction is obtained and the invention may advantageously be used in connection with linear electric motors and thereby be used in transport means of different kinds.

SUMMARY OF THE INVENTION

The invention is mainly characterized in that the beam is double-T-shaped i.e. the web of the T-profiles are oriented in each others elongation and the ball tracks are arranged in the connections between the web of the T and portions of the cross bars emanating therefrom, and that the cross bar/cross bars or the web/webs are designed as catching and delivery ramps for the balls, said ramps forming a tangent to the respective ball track and having a smooth inclination in a direction away from this.

BRIEF DESCRIPTION OF THE DRAWING

FIG. 3 shows a modified embodiment of the beam of the same general shape as shown in FIG 2.

FIG. 4 shows a further embodiment of the beam and

FIG. 5 shows a still further embodiment.

FIG. 6 illustrates a modified embodiment of the invention in which the machine member is arranged to carry a driving motor.

FIG. 7 is a section along line VII—VII in FIG. 6.

FIG. 8 shows a further modified beam according to the invention and

FIG. 9 is a section along line IX—IX in FIG. 8.

DESCRIPTION OF THE PREFERRED EMBODIMENTS

Figure 1:
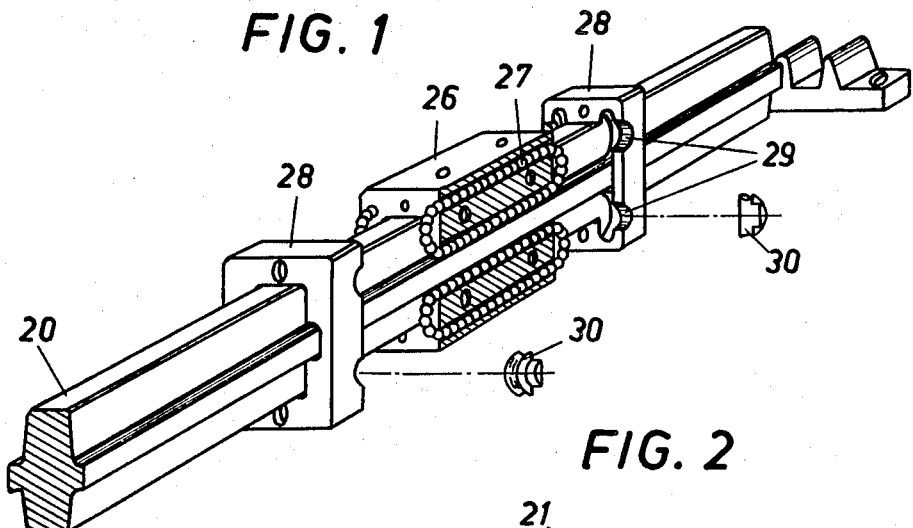
FIG. 1 is an exploded view in perspective of one embodiment of the invention.

A basic embodiment of the invention is shown in FIG. 5. The beam here consists of a single reversed T-profile 10 on which a machine member 11 is moveable in the longitudinal direction of the beam. At each side of a longitudinal central plane 12 through the beam that is at the junction between web and cross bar portions is provided with two parallel ball tracks 13 and 14 respectively which each is designed as a part of a circular arc having about 90° extension. An inclined catching and delivery ramp 15 and 16 respectively merges to each of those ball tracks, said ramps are arranged in the respective cross bar portion and are sloping somewhat away from the respective ball track. At each side of the longitudinal central plane 12 the machine member 11 is provided with recirculation tracks 17 and 18 respectively for the balls 19 which transfer the load between machine member and beam. The details of those components are better shown in FIG. 1. In the very machine member there are of course formed balltracks for the loaded balls and through the embodiment shown here middle lines through the balls and the ball tracks 13 and 14 will be located at an angle A towards each other in such a manner that angular contact is obtained and the machine member will be effectively guided in relation to the longitudinal central plane.

Figure 2:
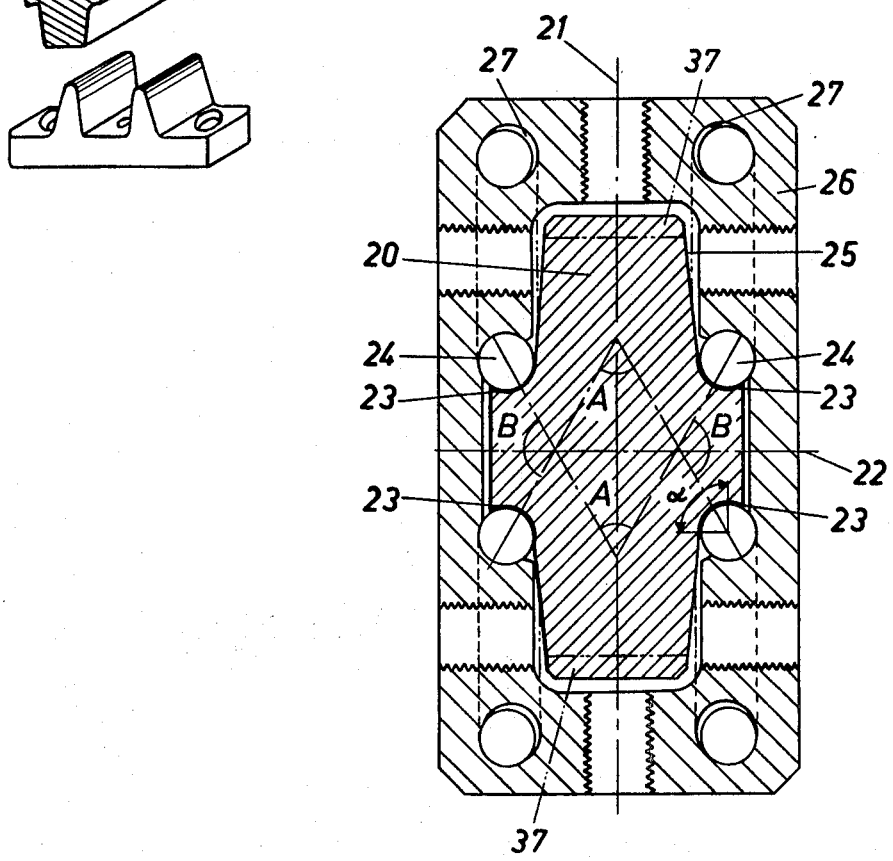
FIG. 2 is a cross section through the machine member and the end of the beam.

With the embodiment shown in FIG. 1 and 2 the beam 20 is designed in such a way that it obtains a high resistance to bending vertically as well as horizontally. The cross section of the beam is basically double-T-shaped in such a manner that the cross bars of the T-profiles are located with their longitudinal sides against each other and are formed as an integral unit while the respective webs of the profiles are oriented in each others elongations.

In each junction between web and cross bar portions there are arranged a track 23 for balls 24. Each ball track extends over an angle α being roughly 90° of the circumference of the ball. In this case there are thus four ball tracks and those are arranged two on each side of the longitudinal central plane 21 of the beam as well as of an imagined plane 22 between the two T-profiles. The sides of the webs of the T-profiles are designed as sloping catching and delivery ramps 25 for the balls and those ramps merges as tangents to the nearby ball track and slops somewhat from this.

Also on this occasion the middle lines through two adjacent ball tracks will form the angle A with respect to the longitudinal central plane 21. In the same manner the middle lines will form the angle B in relation to the imagined plane 22. As each ball tracks extends over about 90° the machine member will be effectively locked in all directions and cannot unintentionally be turned or displaced sideways with respect to the beam.

The machine consists as is best shown in FIG. 1 of a middle portion 26 in which four recirculation passages or bores 27 are arranged. These passages have somewhat larger diameter than the balls so they will run freely through the return passages. At each side of the middle portion there is an end flange 28 and in each of these an outer flection passage portion 29 is formed. Between the middle portion and the end flanges there are further internal deflection portions 30. Of these FIG. 1 only shows the two belonging to the lower exposed ball track. The machine member includes an arcuate trackway for each of the tracks and disposed relative thereto to define a runway providing for angular contact with the ball elements engageable therein.

The deflection passages are oriented at right angles against the imagined plane 22 and the side walls of the member turned against the beam has a rectangular shape in such way that a wedge-shaped space is formed between member and beam. The deflection passages at each ball track thereby will be partly exposed to the beam and the balls thereby will simply and effectively be guided against respectively away from the ball track in the beam in such a way that a smooth load carrying via the balls are obtained.

The beam in this case is provided with cogs 37 running along the beam at each web end. These cogs are intended to serve as power transferring means, whereby the machine member carries an electric motor (not shown in the figure), the output rotational movement of which thus is transformed to a rectilinear movement of the machine member along the beam.

In FIG. 3 there is shown a modified embodiment of the beam with the same basic shape as in FIG. 2. The beam here however is composed of a horizontally arranged portion 31 having I-shaped section which forms the cross bars of the T-profiles and two sheet metal profiles 32, 33 are mounted thereon, said sheet metal profiles serving as web for the profiles and being interconnectable in such a manner that a closed section is obtained. This section will then show ball tracks 23 and inclined ramps 25.

The I-beam in this case may be manufactured by a conductive non-magnetic material of reasons which will be further declared herebelow.

FIG. 4 shows a modified beam in which two T-profiles are oriented with the end of each web against each other and in the elongation of each other and having two flange portions 34 respectively which constitute the cross bars. Each web is widening from the narrower end portions and tapering against the respective cross bar. These tapering webs form the ramps 25 and the ball tracks 23 are located at the junctions between the web portions and the cross bar portions. The recirculation tracks 27 of the balls 24 are formed basically in the same manner as has been described in connection to FIG. 1 and they are oriented in a plane perpendicular to an imagined middle plane 22 between the integral web ends.

The beam in this case may be provided with material insertions as has been intimated at 35, which like the I-beam in FIG. 3 consist of a conductive non-magnetic material e.g. copper or aluminum.

In FIG. 6 and 7 the invention is shown as applied in connection with an electric linear motor 39.

The beam 40 in this case has a cross section substantially corresponding to that of FIG. 2 but the beam 40 differs from this thereby that it has a core 35 of a conductive non-magnetic material. From the manufacturing view the very beam profile therefore is divided along its longitudinal center plane and the two parts are joined around the core 35 by means of any suitable method e.g. spotwelding. The machine member comprises in this case two member portions 41 each being provided with ball tracks 27 for balls 24. The member portions 41 and the motor 39 are joined to one unit by means of bolts 42 mounted in holes 43 which run in the longitudinal direction of the beam. The beam is supported at a number of supports 44 which are fixed to the flooring and positioned along the beam and by this reason the machine member unit is provided with an aperture 45 at its lower side.

The beam serves by means of its core as the armature of the linear motor, whereby the unit upon activation of the motor may move along the beam.

FIGS. 8 and 9 show a beam 46 of a further modified shape. The cross sectional profile corresponds to the beam according to FIGS. 1 and 2 but the beam is in this case provided with magnets 47 at equal distances along its length. Said magnets are inserted in troughholes, which are located at right angle against the longitudinal direction of the beam. The beam is intended to be used together with a machine member of the kind shown in FIG. 1 and 4 which carries an electric linear stepping motor i.e. the movement of the motor is stepwise whereby the motor in cooperation with the separated magnets cause the stepwise movement of the motor and thereby of the machine member.

I claim:

1. The combination of a machine member and elongated beam adapted for motion relative to one another, said beam being generally symmetrical about a longitudinal center plane and formed with at least two parallel arcuate tracks on either side of said center plane, said machine member including an arcuate trackway for each of said tracks and disposed relative thereto defining a runway providing for angular contact with ball elements engageable therein, means defining a recirculation bore in said machine member for each of said cooperating pairs of tracks and trackways, end passages interconnecting the ends of each recirculation bore with the ends of a corresponding ball runway, said machine member being formed with delivery ramps defined by surfaces on said beam, each surface extending tangentially from one of said tracks and angularly relative to said central plane.

2. The combination as claimed in claim 1 wherein the beam is formed of an elongated member having an I-shaped cross section forming the cross bar of the T-profiles and wherein the projection of the T-profiles are formed by sheet metal web members connected to the I-shaped cross bar and provided with ball tracks and ramps.

3. The combination as claimed in claim 1 wherein the beam is of double T-shaped cross section and wherein the webs of the T-profiles are aligned and the ball tracks are located at the juncture between the shanks of the T-profile.

4. The combination as claimed in claim 1 wherein the machine member is adapted to carry an electric driving means arranged for meshing engagement with cogs provided in the shank end surfaces of said T-profile, said shank end being arranged at right angles to said central plane.

5. The combination as claimed in claim 1 wherein said machine member is adapted to mount an electric linear motor and wherein the said beam is formed with a core of a conductive nonmagnetic material which in turn forms the armature for said electric linear motor.

6. The combination as claimed in claim 1 wherein said machine member is adapted to mount an electric linear stepping motor and said beam along its longitudinal direction is provided with a plurality of apertures at a spaced apart predetermined distance and including a magnet mounted in each of said apertures for effecting a stepwise movement of said stepping motor.

* * * * *